May 16, 1933.                R. L. NEWMAN                1,909,216
                              WINDMILL
                        Filed June 26, 1929            2 Sheets-Sheet 2
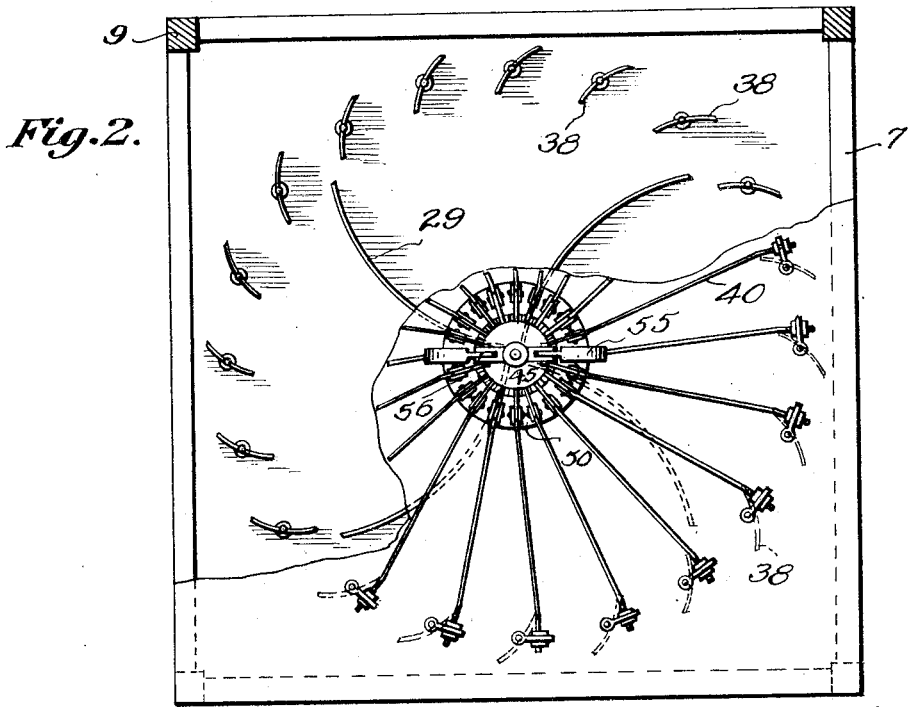
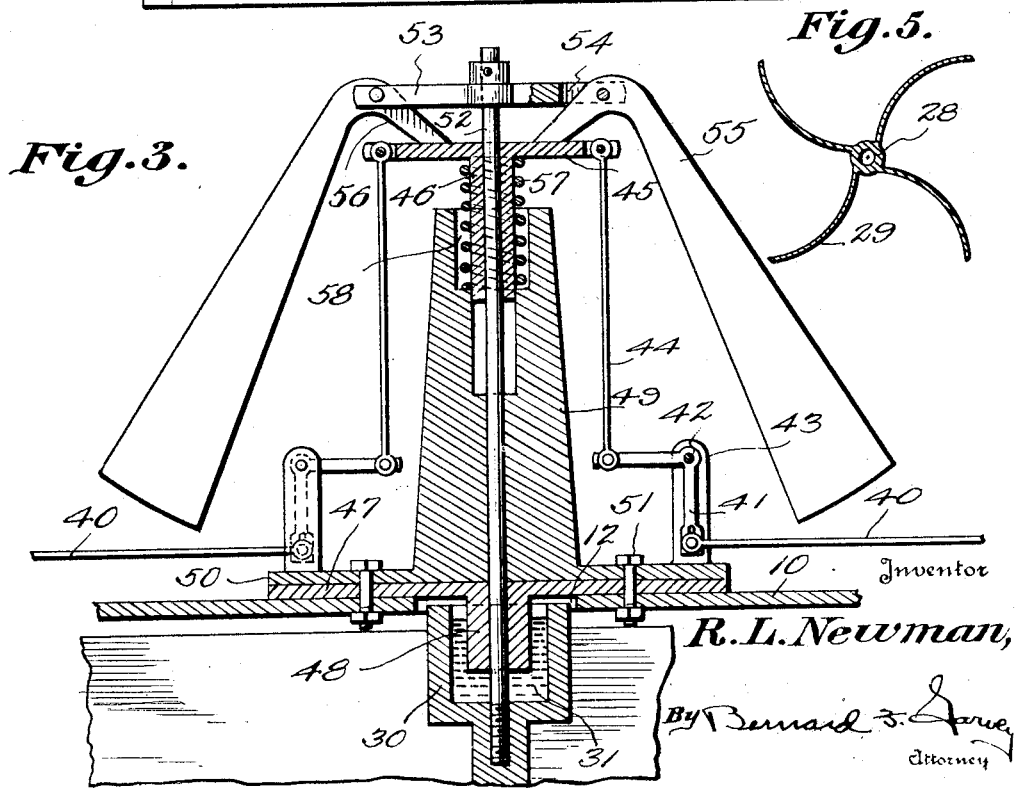

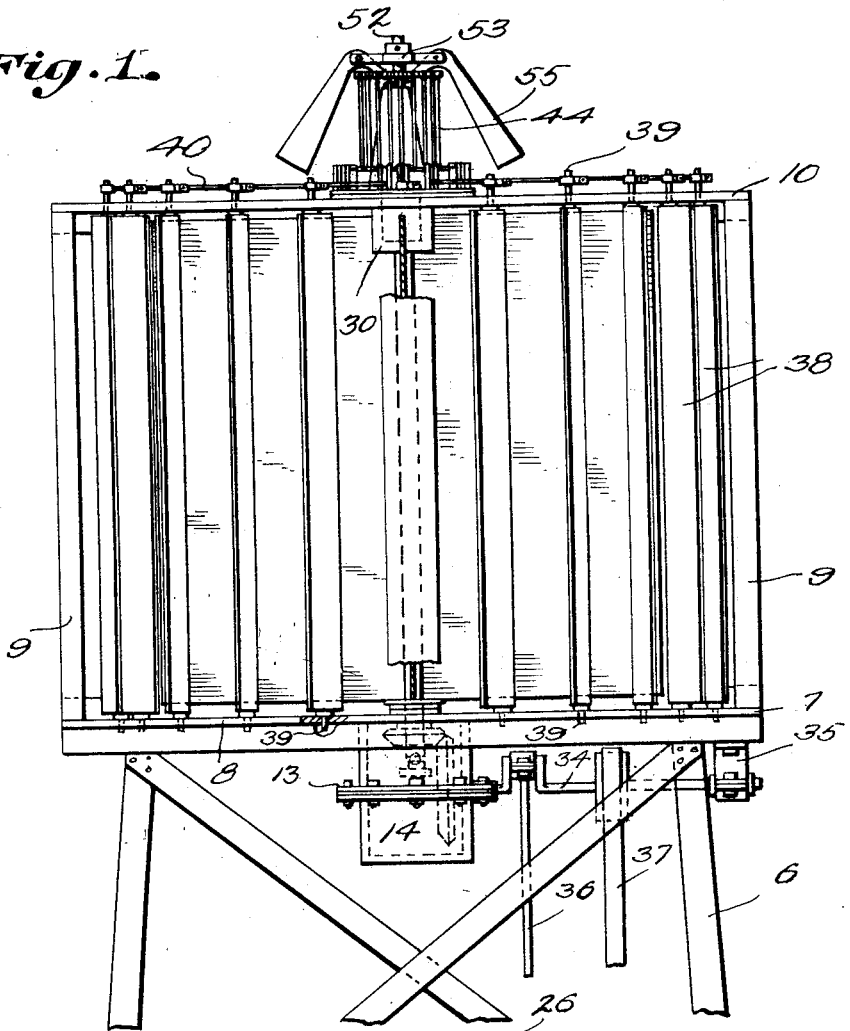
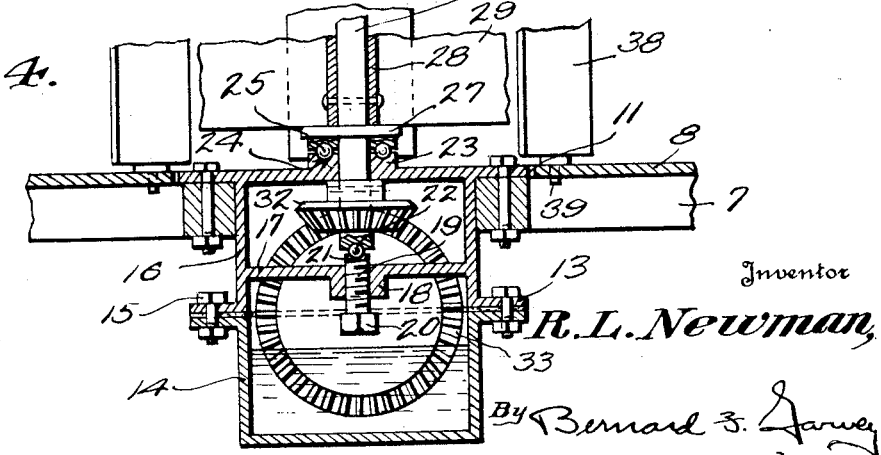

Patented May 16, 1933

1,909,216

UNITED STATES PATENT OFFICE

RICHARD L. NEWMAN, OF CROSBYTON, TEXAS

WINDMILL

Application filed June 26, 1929. Serial No. 373,832.

The present invention consists of a windmill particularly designed to adapt the same for use as a prime mover in the operation of mechanical mechanism of various miscellaney, as well as being useful for pumping water in a manner well-known in the art.

Windmills of various construction have been used extensively for pumping water and to a lesser degree as a prime mover for other purposes. It has been found that windmills generally operate with facility and in a fairly satisfactory manner when an appreciable wind velocity is available, but due principally to a frictional resistance, effective operation is not possible at low wind velocities, especially under five (5) miles an hour. It is the principal object of this invention to provide a wind-driven wheel which is practically frictionless and hence, is operable at exceedingly low wind velocities.

Another object of the invention is to provide a roller bearing wind wheel which is constantly lubricated to decrease resistance and to effect constant operation of the wheel, regardless of the velocity of the wind.

Still another object of the invention is to provide a wind wheel which will effectively operate at a very low wind velocity and is equipped with automatically operated wind governors to provide a wind barrier for protecting the wind wheel during high winds.

Other objects of the invention will be apparent from the following description of the present preferred form of the invention, taken in connection with the accompanying drawings, wherein Fig. 1 is an elevational view of a windmill constructed in accordance with the present invention, a part of which is broken away to disclose details;

Fig. 2 is a plan view of the windmill, a portion of the windmill housing being broken away to disclose the interior structure thereof;

Fig. 3 is a detail, fragmentary vertical sectional view of the windmill governor mechanism, constructed in accordance with the present invention;

Fig. 4 is a detail, fragmentary vertical sectional view, showing the manner of mounting the wind wheel drive shaft and the driven shaft; and Fig. 5 is a detail horizontal sectional view of the wind wheel per se.

The windmill constructed in accordance with the present invention embodies a tower 6, which may be made of wood, metal, or other suitable material, and has a wind wheel housing or casing 7, superimposed thereon. The housing consists of a floor or platform 8, upon which corner stays 9 are mounted, the latter carrying a cover or roof 10. The platform 8 is provided with a central opening 11, which is in vertical alignment with an opening 12 formed in the roof or top 10 of the housing.

An oil reservoir, generally designated 13, is detachably carried by the housing 7 and is countersunk in the latter through the opening 11. The reservoir is formed in two parts, the lower of which, designated 14, constitutes the oil or lubricant well, which is detachably engaged by bolts 15, or otherwise, if desired, to the upper or bearing part 16 of the reservoir. A bearing bar 17 is formed in said upper part 16 of the reservoir and is provided with a central opening around which a bearing boss 18 is formed. The boss is preferably internally screw-threaded, adapted for the reception of a screw-threaded bolt 19, one end of the latter being formed to provide a head 20, while the opposite end is formed to provide a bearing recess 21, in which a ball 22 is mounted. The top of the reservoir is provided with an opening around which a bearing boss or annulus 23 is formed which may be provided with a ball race 24, in which bearings 25 are mounted. The reservoir may be detachably mounted in the floor or platform of the housing 7 in any desired manner.

A wind wheel power shaft 26 is concentrically mounted in the housing 7, the lower end thereof extending downwardly through the boss 23 of the oil reservoir, and having a recess formed in the terminal thereof, which complements the recess 21 of the bearing bolt 19 to house the ball 22. The shaft may be equipped with a bearing plate 27, which has a ball race formed in the bottom face thereof, to complement the race 24 of the reservoir boss 23, for the purpose of housing the ball bearings 25. The wind wheel, constructed in accordance with the present invention, is adapted to be formed with or fixedly secured to the plate 27, so as to rotate with the latter. This wheel comprises a hub 28, which has wings 29 radiating therefrom, the wings being preferably curved to augment the driving force of the wind impinging thereagainst. The upper end of the shaft 26 has an oil font 30 formed thereon or fixedly secured thereto, which is adapted for the reception of an oil or lubricant 31, for a purpose hereinafter described.

The lower end of the shaft 26, within the confines of the reservoir 13, has a bevelled gear 32 fixedly mounted thereon and engaged inmesh with a complemental gear 33, which is also arranged within the confines of the reservoir and is carried by one end of a driven shaft 34. The opposite end of the driven shaft is rotatably mounted in a bearing 35 which is detachably carried by the under face of the housing 7. The driven shaft may have a pump rod 36 and/or a pulley belt 37, or the like, connected thereto, so that power can be taken from the shaft and used for any purpose, in a manner well-known in the art. It is apparent that rotation of the wind wheel imparts movement to the driven shaft 34.

A circular series of vanes 38 is rotatably mounted in the housing 7, each of which consists of an oblong plate curved through its longitudinal axis, the degree of curvature or arc conformed substantially to the curvature of the wings 29 of the wind wheel. Each vane is equipped with a pair of terminal pintles 39, the lower of which is mounted in a complemental opening formed in the bottom 8 of the housing and the upper extended through the top 10 of the housing. Each of the upper pintles is detachably engaged with one end of a rod 40, the opposite end of the latter being pivotally connected to one end of a bell crank lever 41. Each of the bell crank levers 41 is fulcrumed, as indicated at 42, between bearing arms 43, and has its inner end pivotally engaged with one end of a link 44. The opposite end of the link is pivotally engaged with a discal terminal 45, formed on the upper end of a bearing sleeve 46. The vanes 38 are employed to deflect the wind into engagement with the wings 29 of the wind wheel. The arrangement of the vanes and the conformation of the same insures positive feeding of the air into the wheel at all times, so as to effect operation of the latter at all times, even during low wind velocities. In order to protect the wind wheel during high winds, suitable mechanism is provided to rotate the vanes into a closed position, in order to set up a barrier to resist the wind and thereby prevent impingement of the same against the wheel.

The mechanism for closing the vanes consists of a bearing plate 47, which is superimposed on the top 10 of the housing and is provided with a bearing collar 48, which depends from the lower face thereof into the oil font 30, as illustrated to advantage in Fig. 3. The bearing plate 47 carries a pedestal 49, which has a central bore communicating with the bore of the collar 48. The lower end of the pedestal 49 is formed to provide a base 50 which is detachably secured to the bearing plate 47 and top 10 of the windmill housing by bolts 51. The bell crank lever supporting arms 43, heretofore described, are mounted on the base 50 and may be formed integral therewith or fixedly secured thereto. A governor shaft 52 is detachably engaged in the base of the oil font 30 and extends upwardly through the collar 48, the bore of the pedestal 49, and through the bearing sleeve 46, beyond the top of the discal bearing 45. A cross arm 53 is secured to the shaft 52, near the upper end of the latter and has the ends thereof bifurcated, as indicated at 54, adapted for the reception of governor blades 55. The inner end of each governor blade is formed to provide a bill 56, which is pivotally mounted between the furcations of the arm 53, and the terminal of which is in sliding engagement with the top of the discal bearing plate 45. The bearing plate 45 is normally urged upwardly by a helical spring 57, the latter being coiled about the bearing sleeve 46, having one end thereof engaged with the under-face of the bearing plate 45 and the opposite end engaged with the bottom wall of a recess 58, which is formed in the top of the pedestal 49.

In use of this device, under normal conditions, wind is deflected against the wings 29 from the vanes 38 to rotate the wheel and correspondingly impart motion to the driven shaft 34, in a manifest manner. By reason of the particular mounting of the wind wheel, as above described, the latter is very sensitive and rotates under exceedingly low wind velocities. The drive or wind wheel shaft is directly mounted on a single bearing, which is constantly lubricated and which is adjustable to take up wear. The gear connections between the drive and driven shaft are constantly lubricated by reason of their mounting in the oil reservoir. Furthermore, but very slight parasite resistance is set up by the governor mechanism in view of the mounting of the latter in the top of the power shaft.

It is of course to be understood that the windmill may be constructed of metal, wood or any other suitable material, or combinations of materials. It has been found preferable, however, to construct the wind wheel in a metal unit to obtain a maximum impelling force from the wind directed against the wheel. The almost total absence of frictional resistance of the present mill makes the same additionally adaptable for use as a prime mover for power plants, or for power storage plants. Various changes may be made in the device, within the scope of the claim hereto appended.

What is claimed is:

In combination, a wind wheel housing equipped with a lubricant reservoir, a wind wheel shaft mounted on said housing and having its lower terminal engaged in the lubricant reservoir, the upper terminal of the shaft being enlarged and cupped to provide a lubricant font, and a governor shaft, for the wheel, mounted in the font.

RICHARD L. NEWMAN.